US011166035B1

(12) United States Patent
Liu (10) Patent No.: US 11,166,035 B1
(45) Date of Patent: Nov. 2, 2021

(54) METHOD AND DEVICE FOR TRANSCODING VIDEO

(71) Applicant: Wangsu Science & Technology Co., Ltd., Shanghai (CN)

(72) Inventor: Anjie Liu, Shanghai (CN)

(73) Assignee: WANGSU SCIENCE AND TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/088,442

(22) Filed: Nov. 3, 2020

Related U.S. Application Data (63) Continuation of application No. PCT/CN2020/097172, filed on Jun. 19, 2020.

(30) Foreign Application Priority Data

Apr. 30, 2020 (CN) .......................... 202010365039.9

(51) Int. Cl.
| | |
|---|---|
| H04N 19/40 | (2014.01) |
| H04N 19/119 | (2014.01) |
| H04N 19/176 | (2014.01) |
| H04N 19/169 | (2014.01) |
| H04N 19/115 | (2014.01) |

(52) U.S. Cl.
CPC .......... *H04N 19/40* (2014.11); *H04N 19/115* (2014.11); *H04N 19/119* (2014.11); *H04N 19/176* (2014.11); *H04N 19/1883* (2014.11)

(58) Field of Classification Search
USPC .................................................... 375/240.08
See application file for complete search history.

(56) References Cited

U.S. PATENT DOCUMENTS

| | | | |
|---|---|---|---|
| 2013/0330055 A1* | 12/2013 | Zimmermann .... | H04N 21/2743 386/240 |
| 2014/0177706 A1 | 6/2014 | Fernandes et al. | |
| 2015/0350726 A1* | 12/2015 | Tan ........................ | H04N 19/40 348/445 |

(Continued)

FOREIGN PATENT DOCUMENTS

| | | |
|---|---|---|
| CN | 105306960 A | 2/2016 |
| CN | 106791856 A | 5/2017 |

OTHER PUBLICATIONS

Wangsu Science & Technology Co., Ltd., PCT International Search Report, PCT/CN2020/097172, dated Jan. 27, 2021, 4 pgs.

(Continued)

*Primary Examiner* — Behrooz M Senfi
(74) *Attorney, Agent, or Firm* — USCH Law, PC (57) ABSTRACT

The present disclosure discloses a method and device for transcoding a video, which belongs to the video processing technology. The method includes: acquiring a target frame image of a video to be transcoded, and generating a global feature map of the target frame image based on a feature extraction module of a semantic segmentation model; performing feature segmentation on the global feature map based on a feature segmentation module of the semantic segmentation model, and determining a multi-level ROI of the target frame image; and using different transcoding rates to transcode the multi-level ROI and other regions of the target frame image respectively.

18 Claims, 4 Drawing Sheets

(56) References Cited

U.S. PATENT DOCUMENTS

| | | | |
|---|---|---|---|
| 2018/0027241 A1* | 1/2018 | Wu | H04N 19/124 |
| | | | 375/240.03 |
| 2020/0374534 A1* | 11/2020 | Chen | G06N 20/00 |
| 2021/0004974 A1* | 1/2021 | Guizilini | G06T 7/55 |
| 2021/0084362 A1* | 3/2021 | Chen | H04N 21/2187 |

OTHER PUBLICATIONS

Ma, "Development of Model Compression and Inference Acceleration Algorithms of Image Super Resolution Deep Neural Networks," Master's Thesis, published Mar. 15, 2020, 102 pgs.

Li et al., "Road Scene Segmentation Based on NVIDIA Jetson TX2," Journal Article, published Jan. 15, 2019, 7 pgs.

\* cited by examiner

Frontal segmentation map of human body     Backside segmentation map of human body

METHOD AND DEVICE FOR TRANSCODING VIDEO

CROSS REFERENCE TO RELATED APPLICATIONS

The present application is a continuation of PCT Patent Application No. PCT/CN2020/097172, entitled "METHOD AND DEVICE FOR TRANSCODING VIDEO," filed Jun. 19, 2020, which claims priority to Chinese Patent Application No. 202010365039.9, entitled "METHOD AND DEVICE FOR TRANSCODING VIDEO," filed Apr. 30, 2020, each of which is incorporated by reference herein in its entirety.

TECHNICAL FIELD

The present disclosure relates to video processing technologies, and in particular to a method and device for transcoding a video.

BACKGROUND

With the development of internet technology and the continuous acceleration of modern bandwidth, the Internet has become more and more closely connected with people's lives. More and more people are keen to acquire videos on the Internet to enrich their lives. Nowadays, high-quality videos have become the first choice for people's daily needs. For video service platforms, they often need to transcode video data on the server in order to adapt to different network bandwidths, terminal processing capabilities, and user demands.

A background server of the video service platform may first acquire an initial video that has been encapsulated (which may be called an input video), then generate multiple transcoding tasks according to different transcoding rules and create a corresponding transcoding process for each of the transcoding tasks, and further implement steps of parsing, transcoding, and encapsulating the video data of the initial video through transcoding threads in the transcoding process. After transcoding the video data and receiving a user terminal's request for acquiring the video data which is under a certain transcoding rule, the background server may push the generated video data that has been transcoded to the user terminal.

If a code rate of the transcoded video is too small, the picture quality of the video may be poor and even picture distortion or mosaic phenomenon may occur. However, if the code rate of the transcoded video is too large, it may result in waste of bandwidth resources during video transmission. Therefore, there is an urgent need for a video transcoding technology that can not only guarantee picture quality of the video, but also reduce consumption of the bandwidth resources during the video transmission.

SUMMARY

In order to solve problems of the existing technology, embodiments of the present disclosure provide a method and video for transcoding a video, and the technical solution is as follows.

The embodiments of the present disclosure provide a method for transcoding a video, and the method includes:
acquiring a target frame image of a video to be transcoded, and generating a global feature map of the target frame image based on a feature extraction module of a semantic segmentation model;
performing feature segmentation on the global feature map based on a feature segmentation module of the semantic segmentation model, and determining a multi-level ROI of the target frame image; and
using different transcoding rates to transcode the multi-level ROI and other regions of the target frame image respectively.

The embodiments of the present disclosure provide a device for transcoding a video, and the device includes:
a semantic segmentation module, configured to acquire a target frame image of a video to be transcoded, generate a global feature map of the target frame image based on a feature extraction module of a semantic segmentation model, perform feature segmentation on the global feature map based on a feature segmentation module of the semantic segmentation model, and determine a multi-level ROI of the target frame image; and a video transcoding module, configured to use different transcoding rates to transcode the multi-level ROI and other regions of the target frame image respectively.

The embodiments of the present disclosure provide a background server including a processor and a memory, where the memory stores at least one instruction, at least one program, a code set or an instruction set which, when loaded and executed by the processor, causes the processor to perform the method for transcoding the video described above.

The embodiments of the present disclosure provide a computer readable storage medium storing at least one instruction, at least one program, a code set or an instruction set which, when loaded and executed by a processor, causes the processor to perform the method for transcoding the video described above.

The technical solutions provided in the embodiments of the present disclosure have the following beneficial effects. In the embodiments of the present disclosure, the background server acquires the target frame image of the video to be transcoded and generates the global feature map of the target frame image based on the feature extraction module of the semantic segmentation model, performs feature segmentation on the global feature map based on the feature segmentation module of the semantic segmentation model and determines the multi-level ROI of the target frame image, and uses different transcoding rates to transcode the multi-level ROI and other regions of the target frame image respectively. In this way, the background server segments the multi-level ROI from the video frame image through the semantic segmentation model when transcoding the video, so that a range of the ROI may be flexibly and accurately determined according to different scenes, and an area of the effective feature in the ROI is guaranteed to the greatest extent. And then, each ROI is transcoded using different transcoding rates, so that contents of all levels in the video frame image may occupy the code rate share reasonably, which can not only ensure picture quality of the video, but also reduce consumption of bandwidth resources during video transmission.

BRIEF DESCRIPTION OF THE DRAWINGS

In order to illustrate the technical solutions in the embodiments of the present disclosure more clearly, the accompanying drawings used in the description of the embodiments are briefly described below. It is apparent that the drawings in the following description are merely some embodiments of the present disclosure. For those skilled in the art, other drawings may also be obtained according to these drawings without any inventive work.

DETAILED DESCRIPTION

In order to make the objectives, technical solutions, and advantages of the present disclosure clearer, the embodiments of the present disclosure will be described in detail with reference to the accompanying drawings.

An embodiment of the present disclosure provides a method for transcoding a video, and an execution subject of the method may be a background server of a video service platform. Herein, the background server may have a video transcoding function. After receiving a data stream of a video to be transcoded, the background server may transcode a video frame image, and then may provide the transcoded video data to the outside. At the same time, the background server may further have an image analysis function, and may adjust the transcoding processing on the video based on an image analysis result. The video service platform may be provided with multiple background servers, each of the background servers may be used to perform transcoding tasks for multiple videos, and each of the videos may correspond to multiple transcoding tasks according to transcoding demands. The background server described above may include a processor, a memory and a transceiver. The processor may be configured to perform the processing of transcoding the video in the following process, the memory may be configured to store the data required and generated in the following processing process, and the transceiver may be configured to receive and send relevant data in the following processing process. The method for transcoding the video disclosed in this embodiment may be applied to a live video, and may also be applied to a video on demand.

Figure 1:
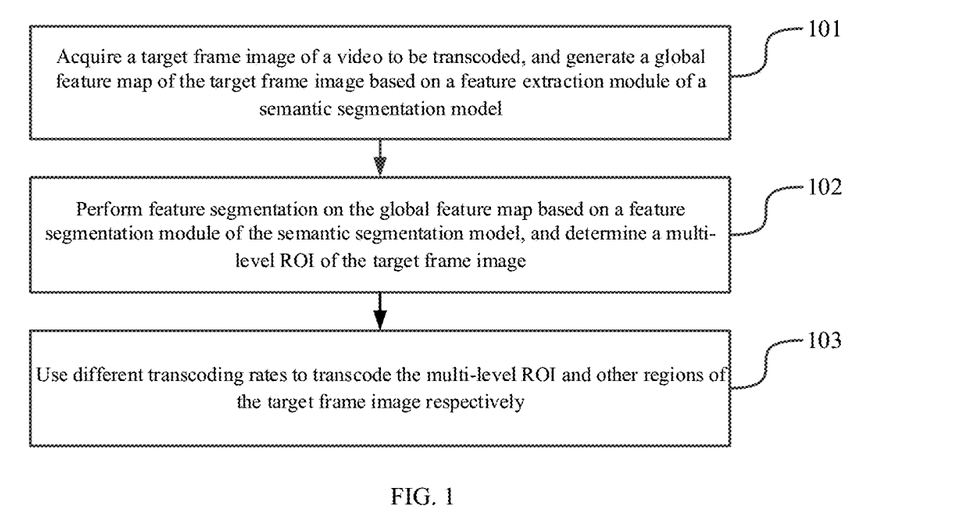
FIG. 1 is a flowchart of a method for transcoding a video provided in an embodiment of the present disclosure.

The processing flow shown in FIG. 1 will be described in detail below in combination with specific embodiments, and the content may be as follows.

In step 101, a target frame image of a video to be transcoded is acquired, and a global feature map of the target frame image is generated based on a feature extraction module of a semantic segmentation model.

In implementation, after acquiring the data stream of a certain video, the background server may judge whether the video is a video to be transcoded (that is, whether there is a transcoding demand) according to a video transcoding rule preset by the video service platform. If the video is a video to be transcoded, the background server may transcode frame images of the video to be transcoded sequentially. Specifically, the background server may first acquire the target frame image of the video to be transcoded, and then input the target frame image into the feature extraction module of the semantic segmentation model to generate the global feature map of the target frame image. Herein, the target frame image may be any frame image of the video to be transcoded, also be any key frame image of the video to be transcoded or any frame image within a specified time period of the video to be transcoded, which may depend on transcoding demands.

In step 102, feature segmentation is performed on the global feature map based on a feature segmentation module of the semantic segmentation model, and a multi-level region of interest (ROI) of the target frame image is determined.

Figure 2:
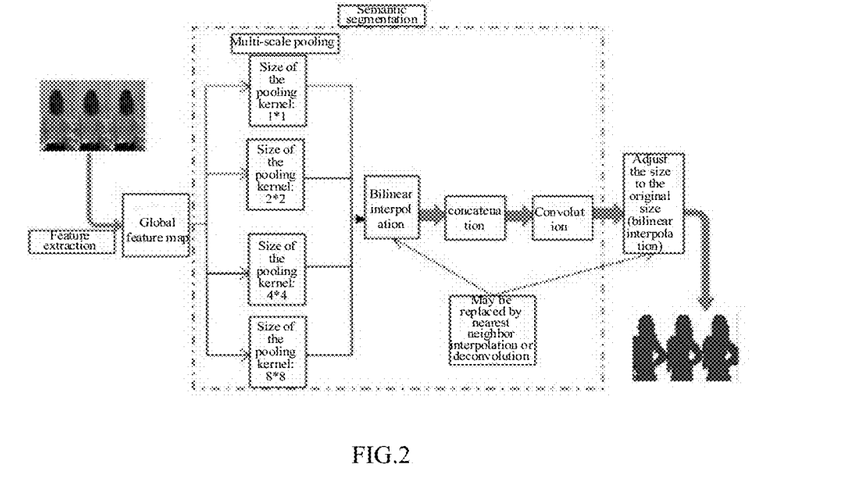
FIG. 2 is a flowchart of semantic segmentation provided in an embodiment of the present disclosure.

In implementation, after generating the global feature map of the target frame image, the background server may input the global feature map into the feature segmentation module of the semantic segmentation model to perform feature segmentation processing, and then may acquire the multi-level ROI of the target frame image according to a segmentation result. Herein, the semantic segmentation model in this embodiment may be a Pyramid Scene Parsing Network (PSPNet) model, and FIG. 2 shows an internal structure of the PSPNet model. The target frame image is firstly processed through the feature extraction module (which may be a Residual Network 50 (ResNet50) model in this embodiment) to acquire a preliminary feature map (i.e. the global feature map), and the global feature map is further processed through multi-size pooling where sizes of pooling kernels are respectively selected as 1*1, 2*2, 4*4 and 8*8 to obtain intermediate maps of the four sizes. The sizes of all intermediate maps are unified through bilinear interpolation or deconvolution operation, and then the features of the multiple intermediate maps are combined through a concatenation operation (i.e. concatenating several feature maps in a dimension of channel through a concatenate function). Finally, pixel-level segmentation tasks may be completed for the target frame image after convolution and upsampling are performed. Next, after image semantic segmentation is implemented, the background server may select a segmented part of the image area as the multi-level ROI of the target frame image.

Figure 3:
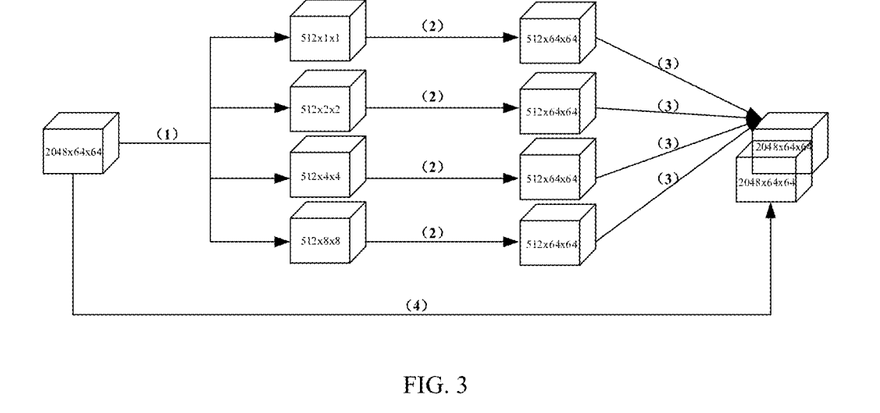
FIG. 3 is a structural schematic diagram of a pyramid pooling module of an existing PSPNet model provided in an embodiment of the present disclosure.
Figure 4:
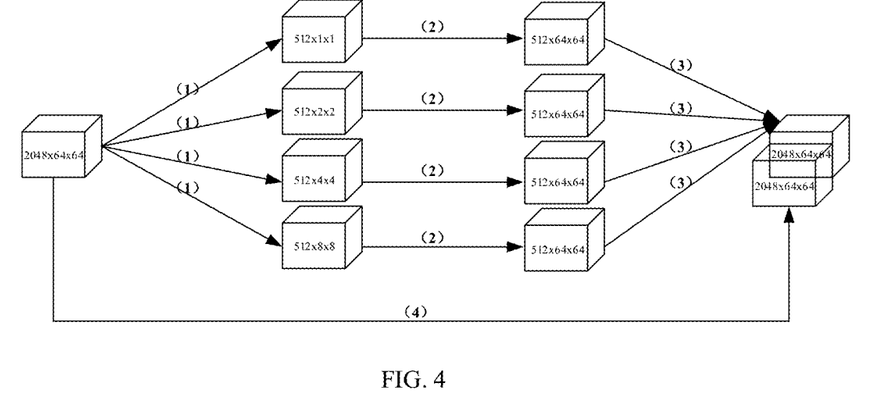
FIG. 4 is a structural schematic diagram of a pyramid pooling module of a reconstructed PSPNet model provided in an embodiment of the present disclosure.

Here, the PSPNet model may use a TensorRT engine to implement an accelerated operation, so as to improve a rate of the video transcoding. Specifically, for a self-adaptive pooling layer in an existing PSPNet model, a set of pooling layers of different sizes may be used to replace the self-adaptive pooling layer to achieve a similar effect of self-adaptive pooling and realize TensorRT acceleration. For a bilinear upsampling layer in the existing PSPNet model, a transpose convolution layer may be used to replace the bilinear upsampling layer to achieve a similar effect of the self-adaptive pooling and realize the TensorRT acceleration. For ease of understanding, taking a 2048×64×64 feature map (i.e., the number of channels is 2048 and the image size is 64×64) output by the feature extraction module as an example, the following content respectively provides processing processes of a pyramid pooling module of the existing PSPNet model and a pyramid pooling module of a reconstructed PSPNet model (both of them take four-scale feature fusion processing as an example, and the PSPNet model may also support any other multiple-scale feature fusion).

1. The pyramid pooling module of the existing PSPNet model may refer to FIG. 3.

(1) Four feature maps of different scales are generated through the self-adaptive pooling layer, and a 1×1 convolutional layer is used to reduce the number of channels to obtain feature maps of 512×1×1, 512×2×2, 512×4×4 and 512×8×8;

(2) The four feature maps of 512×1×1, 512×2×2, 512×4×4 and 512×8×8 are respectively processed through the bilinear upsampling layer to be enlarged by different multiples in image size, so as to obtain four 512×64×64 feature maps.

(3) The four 512×64×64 feature maps are concatenated along the channel dimension into a 2048×64×64 feature map;

(4) The 2048×64×64 feature map is concatenated with an input feature map to obtain a 4096×64×64 feature map as an output.

2. The pyramid pooling module of the reconstructed PSPNet model may refer to FIG. 4.

(1) The input image is subsampled respectively through four pooling layers of different sizes (kernel sizes are 64, 32, 16 and 8 respectively and strides are equal to the kernel sizes respectively) to obtain four feature maps of different scales, and the 1×1 convolutional layer is used to reduce the number of channels so as to obtain feature maps of 512×1×1, 512×2×2, 512×4×4 and 512×8×8;

(2) The four feature maps of 512×1×1, 512×2×2, 512×4×4 and 512×8×8 are respectively processed through the transpose convolution layer to be enlarged by different multiples in image size, so as to obtain four 512×64×64 feature maps. Herein, a kernel size, stride and padding may be set by the transpose convolution layer to achieve the purpose of a fixed multiple of the upsampling. For example, the feature map is desired to be enlarged n times, then kernel size=2n, stride=n, and padding=rounded (n/2);

(3) The four 512×64×64 feature maps are concatenated along the channel dimension into a 2048×64×64 feature map;

(4) The 2048×64×64 feature map is concatenated with the input feature map to obtain a 4096×64×64 feature map as the output.

Figure 5:
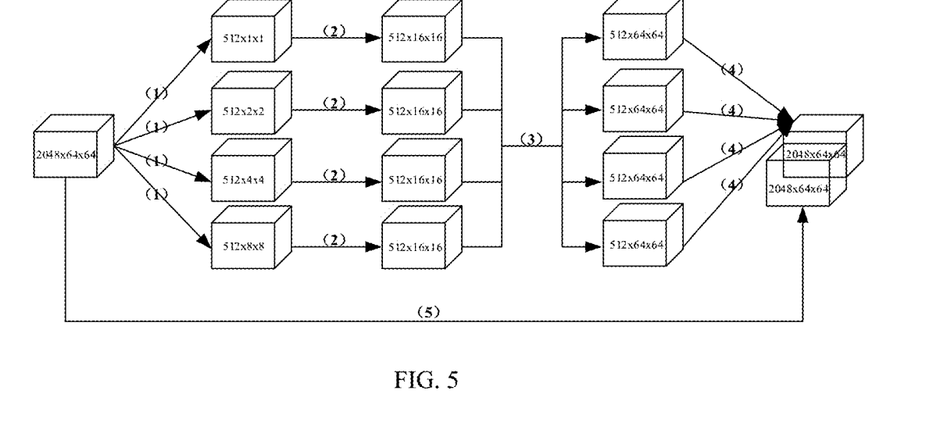
FIG. 5 is another structural schematic diagram of a pyramid pooling module of a reconstructed PSPNet model provided in an embodiment of the present disclosure.

In one embodiment, the feature maps of multiple scales may be set to share the same transpose convolution layer to reduce the number of parameters and an amount of calculation, and the corresponding processing may be as follows. The bilinear upsampling layers of multiple scales in the existing PSPNet model are replaced by a nearest neighbor pool upsampling layer and a shared transpose convolution layer.

In implementation, when the background server uses the transpose convolution layer to replace the bilinear upsampling layer in the existing PSPNet model, the nearest neighbor pool upsampling layer and the shared transpose convolution layer may be used for replacement with regard to the bilinear upsampling layers of multiple scales. That is, the nearest neighbor upsampling layer with no parameters is first used to upsample the feature maps of multiple scales to the same size, and then the same shared transpose convolution layer is shared to uniformly enlarge the feature maps to a specified size. Specifically, referring to FIG. 5, continuing with the example of the 2048×64×64 feature map (i.e., the number of channels is 2048 and the image size is 64×64) output by the feature extraction module, the processing process of the pyramid pooling module of the reconstructed PSPNet model may be as follows.

(1) The input image is subsampled respectively through four pooling layers of different sizes (kernel sizes are 64, 32, 16 and 8 respectively and strides are equal to the kernel sizes respectively) to obtain four feature maps of different scales, and the 1×1 convolutional layer is used to reduce the number of channels so as to obtain feature maps of 512×1×1, 512×2×2, 512×4×4 and 512×8×8;

(2) The four feature maps of 512×1×1, 512×2×2, 512×4×4 and 512×8×8 are respectively upsampled to the size of 512×16×16 through nearest neighbor interpolation;

(3) The 512×16×16 feature map is enlarged 4 times through the shared transpose convolution layer to obtain a 512×64×64 feature map;

(4) The four 512×64×64 feature maps are concatenated along the channel dimension into a 2048×64×64 feature map;

(5) The 2048×64×64 feature map is concatenated with the input feature map to obtain a 4096×64×64 feature map as the output.

Of course, other models such as a U-Net model (Olaf Ronneberger, Philipp Fischer, et al. (2015), "U-Net: Convolutional Networks for Biomedical Image Segmentation", https://arxiv.org/pdf/1505.04597.pdf), a LinkNet model (Sanghyun Woo, Dahun Kim, et al. "LinkNet: Relational Embedding for Scene Graph", https://arxiv.org/pdf/1811.06410.pdf), a Point-wise Spatial Attention (PSANet) model, an High-Resolution Network (HRNet) model, an Object Context Network (OCNet) model, a Deeplab version 3 (DeepLabv3) model and a Deeplab version 3+ (DeepLabv3+) model may also be selected as the semantic segmentation model, and the models may be adaptively modified before the selection.

In one embodiment, ROIs of different levels may correspond to different components of an object. Correspondingly, the processing of step 102 may be as follows: performing feature segmentation on the global feature map based on the feature segmentation module of the semantic segmentation model, and determining multiple components of at least one target object in the target frame image; and determining the multi-level ROI of the target frame image based on a transcoding priority corresponding to each of the components.

Figure 6:
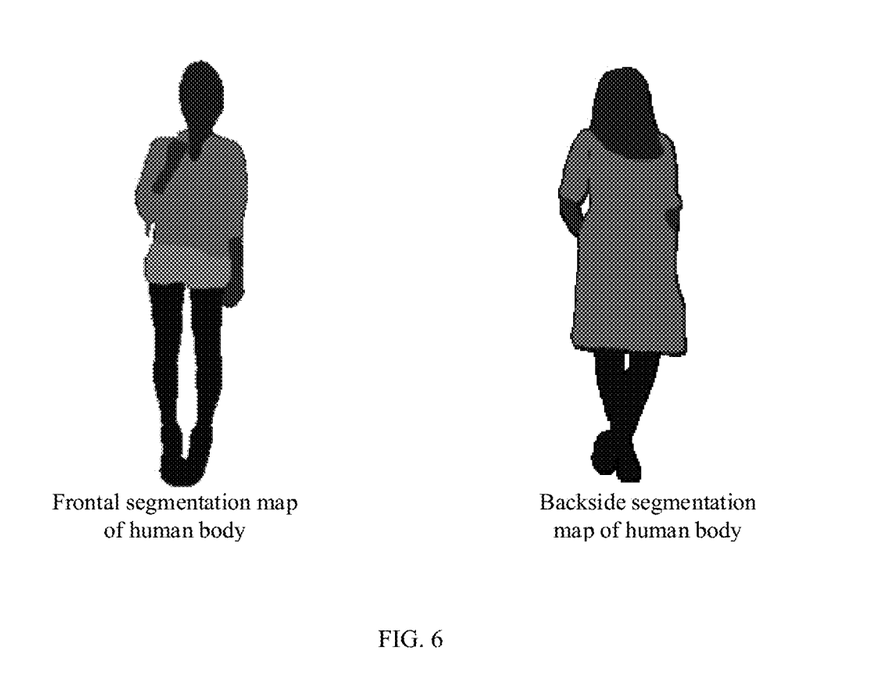
FIG. 6 is an output diagram of performing semantic segmentation on a video frame image provided in an embodiment of the present disclosure.

In implementation, after the background server inputs the global feature map of the target frame image into the feature segmentation module, the feature segmentation of the target frame image may be realized, so that multiple components of at least one target object in the target frame image may be obtained. It may be understood that the segmentation rule of the target object and its components may be generated by the semantic segmentation model based on the training of a large amount of image materials. That is, it is possible to define which objects need to be segmented from the video frame image and which components of the object need to be segmented independently through model training. FIG. 6 shows an exemplary result of the semantic segmentation, where the entire image contains two parts: background and human body, and the human body is further subdivided into five parts: head, upper body, lower body, arms and legs. After that, the background server may determine the multi-level ROI of the target frame image based on the transcoding priority corresponding to each of the components. Herein, the higher the transcoding priority corresponding to the ROI, the higher the transcoding rate of the ROI; other regions use a lowest transcoding rate for transcoding. It should be noted that the transcoding priorities of different components of different target objects may be preset in the background server. For example, the human head has a highest transcoding priority, and the transcoding priorities of the upper body, the lower body and limbs decrease sequentially. In addition, components with the same transcoding priority may exist between different objects. For example, the transcoding priorities of the human head and a car logo in one image may both belong to the highest level. That is to say, the ROI of each level in the target frame image may contain multiple components of multiple objects.

In one embodiment, the background server may periodically train the semantic segmentation model based on image materials in a preset training material set. Herein, the image materials are marked with contour lines of various components of different objects.

In implementation, the background server may periodically perform optimal training on the semantic segmentation model to improve accuracy of the semantic segmentation of the semantic segmentation model to images. Therefore, a technician of the video service platform may select various frame images of various types of videos, and use an open source annotation tool (such as labelme) to mark the contour lines of various components of different objects in the frame images, so that the marked frame images may be stored in the preset training material set as image materials for training the semantic segmentation model. Herein, when marking the contour line, the technician may selectively mark a part of the objects in the image as needed, and may divide the objects arbitrarily as required. In this way, the background server may periodically train the semantic segmentation model based on the image materials in the preset training material set.

In one embodiment, for different types of frame images, different semantic segmentation models may be selected for the semantic segmentation. Correspondingly, the processing before feature extraction is performed on the target frame image may be as follows: calling a target video type of the video to be transcoded and a target semantic segmentation model corresponding to the target image type of the target frame image.

In implementation, the background server may train dedicated semantic segmentation models for frame images in videos of different video types, and one semantic segmentation model may be dedicated to performing the semantic segmentation on frame images in videos of one video type. For example, there may be different PSPNet models corresponding to different video types, such as food, games, sports and the like. In this way, before performing the semantic segmentation on the video to be transcoded, the background server may first detect the target video type to which the video to be transcoded belongs and then call the target semantic segmentation model corresponding to the target video type. It should be understood that the background server may set training material sets corresponding to multiple video types when training the semantic segmentation model. One training material set may contain image materials of the same video type, so that the background server may use each of the training material sets to train the semantic segmentation model corresponding to the respective video type.

Of course, the background server may also train dedicated semantic segmentation models for frame images of different image types, and one semantic segmentation model may be dedicated to performing the semantic segmentation on frame images of one image type. For example, there may be different PSPNet models corresponding to different image types such as person images, food images, indoor environment images and the like. In this way, after acquiring the target frame image, the background server may first detect the target image type to which the target frame image belongs, and then call the target semantic segmentation model corresponding to the target image type. Similarly, when training the semantic segmentation model, the background server may set training material sets corresponding to multiple image types. One training material set may contain image materials of the same image type, so that the background server may use each of the training material sets to train the semantic segmentation model corresponding to the respective image type.

In this embodiment, for frame images of different image types in videos of different video types, dedicated semantic segmentation models may also be trained, and one semantic segmentation model may be dedicated to performing the semantic segmentation on frame images of one image type in the video of one video type. For example, there may be different semantic segmentation models corresponding to character images in food videos, task images in sports videos, and the like. In this way, after acquiring the target frame image, the background server may first detect the target video type to which the video to be transcoded belongs and the target image type to which the target frame image belongs, and then call the target semantic segmentation model corresponding to the target video type and the target image type. Similarly, when training the semantic segmentation model, the background server may set training material sets corresponding to multiple image types under multiple video types. One training material set may contain image materials of the same image type under the same video type, so that the background server may use each of the training material sets to train the semantic segmentation model corresponding to the respective image type under the respective video type.

In step 103, different transcoding rates are used to transcode the multi-level ROI and other regions of the target frame image respectively.

In implementation, after determining the multi-level ROI of the target frame image, the background server may use different transcoding rates to transcode the ROI of each level and other regions in the target frame image except the ROI. Herein, the level of the ROI may be determined according to the image content within the region. For example, if the target frame image is a whole body image of a person, the head may be set as the highest-level ROI, the upper body may be set as the second highest-level ROI, the lower body may be set as the middle-level ROI, the limbs may be set as the low-level ROI, and the background may be set as the lowest-level ROI. Different transcoding rates may be selected for the ROIs of different levels, and the same transcoding rate may be selected for adjacent ROIs.

In one embodiment, the transcoding area may be used to set the transcoding rate of each region of the image. Correspondingly, the processing of step 103 may be as follows: selecting a target-level transcoding rate sequentially in a descending order of the transcoding rate; selecting, in a descending order of the transcoding priority, a transcoding region corresponding to the target-level transcoding rate from unselected ROIs according to the transcoding area corresponding to the target-level transcoding rate.

Herein, the target-level transcoding rate may be the transcoding rate of any level.

In implementation, the background server may support transcoding rates of multiple levels for video frame image transcoding. When transcoding each of the regions in the target frame image, the background server may sequentially select the target-level transcoding rate in a descending order of the transcoding rate first. After that, the background server may acquire a preset transcoding area corresponding to the target-level transcoding rate, select a first ROI from all the unselected ROIs in a descending order of the transcoding priority at the same time, and then compare the area of the first ROI with the transcoding area. If the area of the first ROI is less than the transcoding area, a second ROI with a next-level transcoding priority is selected, and the sum of the areas of the first ROI and the second ROI is compared with the transcoding area. If the sum of the areas of the two ROIs is still less than the transcoding area, a third ROI with a further-next-level transcoding priority may be selected and the area comparison may be continued, and so on, until the sum of all selected ROIs is greater than the transcoding area. Furthermore, the background server may use all the selected ROIs as transcoding regions corresponding to the target-level transcoding rate.

In details, based on the above processing, the areas of all the selected transcoding regions will be greater than the preset transcoding area, which may cause load pressure on device performance and line bandwidth. Therefore, an excess-area region may be selected from a ROI with the lowest transcoding priority in the ROIs corresponding to the transcoding rate of each level, and then the excess-area region may be transferred into the transcoding region corresponding to the next-level transcoding rate. For example, an edge region of the ROI may be selected during the selection of the excess-area region.

In one embodiment, the background server may periodically adjust the transcoding area corresponding to the transcoding rate of each level according to current device performance load and line bandwidth load, and attribute information of the video to be transcoded.

In implementation, the background server may periodically detect the current device performance load and line bandwidth load, and adjust the transcoding processing of each video to be transcoded on a current device according to a detection result. Specifically, the background server may first determine one or more videos to be transcoded for which transcoding processing needs to be adjusted according to the attribute information of all videos to be transcoded. After that, the background server may adjust the transcoding area corresponding to the transcoding rate of each level for each video to be transcoded according to the attribute information of the video to be transcoded and the above detection result. For example, if both the current device performance load and the line bandwidth load are relatively low, a video to be transcoded with higher popularity may be selected and the transcoding area corresponding to a high transcoding rate may be increased. And if both the current device performance load and the line bandwidth load are relatively high, the video to be transcoded with lower popularity may be selected and the transcoding area corresponding to the high transcoding rate may be reduced. Of course, in addition to the video popularity, the background server may also select the video to be transcoded that needs to be adjusted according to multi-dimensional attribute information such as a video owner, posting time, video type and video duration.

In one embodiment, the components of different types of objects have different transcoding priorities in different types of videos. Correspondingly, the processing after multiple components of at least one target object in the target frame image is determined may be as follows: adjusting the transcoding priority corresponding to the components of each target object according to a video type of the video to be transcoded and an object type of each target object.

In implementation, after performing the semantic segmentation on the target frame image to obtain multiple components of the target objects in the target frame image, the background server may acquire the video type of the video to be transcoded and the object type of each target object, and then adjust the transcoding priorities corresponding to the components of each target object based on the two type information. It should be understood that the key contents present on the pictures of different types of videos are also different. For example, in dance videos, the attention for the trunk and limbs of human body is greater than that of the head of human body, so the transcoding priority of the trunk and limbs of human body may be increased, and the transcoding priority of the head may be decreased. However, in talk show videos, the transcoding priority of the head of human body may be higher than the transcoding priority of the trunk and limbs of human body. And another example is that, compared with person videos, the transcoding priority of the human body may be lower than the transcoding priority of the scene in tourism videos. In this embodiment, the background server may also adjust the transcoding priorities corresponding to the components of each of the objects based on the image type of each of the frame images and the object type of each of the objects in the frame image.

In one embodiment, the transcoding rate of a specified region in the video frame image may be adjusted based on actual demands. Correspondingly, the processing of step 103 may be as follows: receiving information of feature clarity or fuzz of the video to be transcoded, and determining a target feature region in the target frame image according to the information of feature clarity or fuzz; using different transcoding rates to transcode the multi-level ROI, the target feature region and other regions of the target frame image respectively.

In implementation, the video provider or the technician of the video service platform may set the information of feature clarity or fuzz of the video to be transcoded at the background server, so as to improve or reduce transcoding clarity of one or some of feature contents in the video frame image. In this way, when transcoding the video to be transcoded, the video server may receive the information of feature clarity or fuzz of the video to be transcoded, and then determine the target feature region in the target frame image according to the information of feature clarity or fuzz. The target feature region contains the feature content directed to by the information of feature clarity or fuzz. After that, the background server may use different transcoding rates to transcode the multi-level ROI, the target feature region and other regions of the target frame image respectively. Herein, the information of feature clarity or fuzz may directly include a specific value of the transcoding rate of the target feature region, or may also include a adjustment range of the transcoding rate of the target feature region.

In the embodiments of the present disclosure, the background server acquires the target frame image of the video to be transcoded and generates the global feature map of the target frame image based on the feature extraction module of the semantic segmentation model, performs feature segmentation on the global feature map based on the feature segmentation module of the semantic segmentation model and determines the multi-level ROI of the target frame image, and uses different transcoding rates to transcode the multi-level ROI and other regions of the target frame image respectively. In this way, the background server segments the multi-level ROI from the video frame image through the semantic segmentation model when transcoding the video, so that a range of the ROI may be flexibly and accurately determined according to different scenes, and an area of the effective feature in the ROI is guaranteed to the greatest extent. And then, each ROI is transcoded using different transcoding rates, so that contents of all levels in the video frame image may occupy the code rate share reasonably, which can not only ensure picture quality of the video, but also reduce consumption of bandwidth resources during video transmission.

Figure 7:
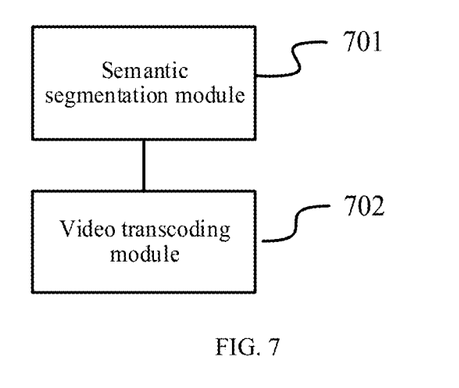
FIG. 7 is a structural schematic diagram of a device for transcoding a video provided in an embodiment of the present disclosure.

Based on the same technical concept, an embodiment of the present disclosure further provides a device for transcoding the video. As shown in FIG. 7, the device includes:

a semantic segmentation module 701, configured to acquire a target frame image of a video to be transcoded, generate a global feature map of the target frame image based on a feature extraction module of a semantic segmentation model, perform feature segmentation on the global feature map based on a feature segmentation module of the semantic segmentation model, and determine a multi-level ROI of the target frame image; and a video transcoding module 702, configured to use different transcoding rates to transcode the multi-level ROI and other regions of the target frame image respectively.

In one embodiment, the semantic segmentation module 701 is configured to:

determine multiple components of at least one target object in the target frame image; and determine the multi-level ROI of the target frame image based on a transcoding priority corresponding to each of the components.

In an embodiment, the video transcoding module 702 is configured to:

select a target-level transcoding rate sequentially in a descending order of the transcoding rate; and select, in a descending order of the transcoding priority, a transcoding region corresponding to the target-level transcoding rate from unselected ROIs according to a transcoding area corresponding to the target-level transcoding rate.

In the embodiments of the present disclosure, the background server acquires the target frame image of the video to be transcoded and generates the global feature map of the target frame image based on the feature extraction module of the semantic segmentation model, performs feature segmentation on the global feature map based on the feature segmentation module of the semantic segmentation model and determines the multi-level ROI of the target frame image, and uses different transcoding rates to transcode the multi-level ROI and other regions of the target frame image respectively. In this way, the background server segments the multi-level ROI from the video frame image through the semantic segmentation model when transcoding the video, so that a range of the ROI may be flexibly and accurately determined according to different scenes, and an area of the effective feature in the ROI is guaranteed to the greatest extent. And then, each ROI is transcoded using different transcoding rates, so that contents of all levels in the video frame image may occupy the code rate share reasonably, which can not only ensure picture quality of the video, but also reduce consumption of bandwidth resources during video transmission.

Figure 8:
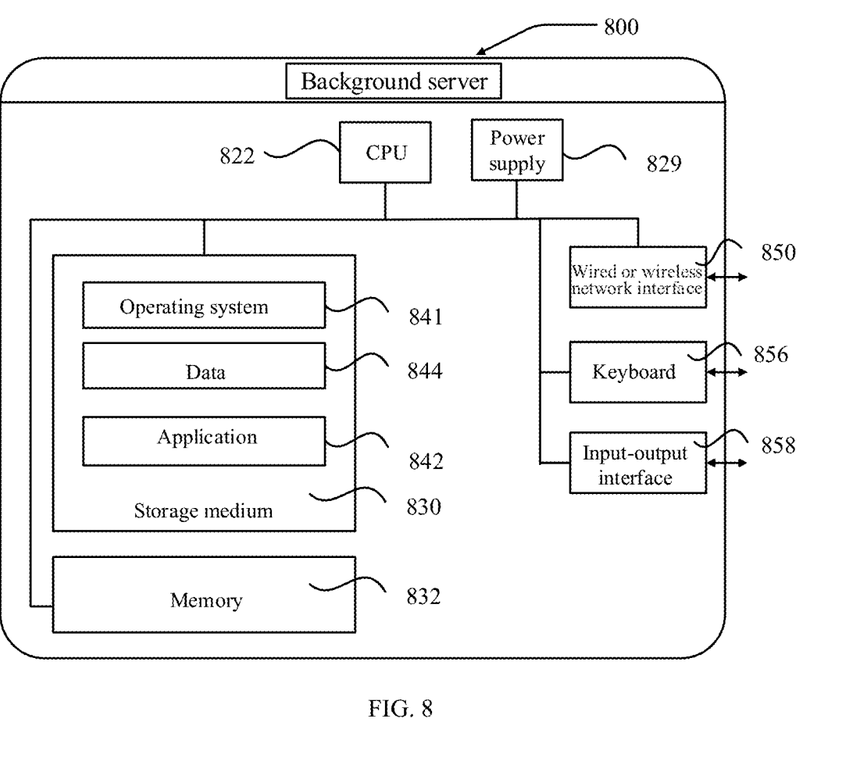
FIG. 8 is a structural schematic diagram of a background server provided in an embodiment of the present disclosure.

FIG. 8 is a structural schematic diagram of a background server provided in an embodiment of the present disclosure. The background server 800 may vary considerably due to different configurations or performance, and may include one or more central processing units 822 (such as one or more processors), a memory 832, and one or more the storage mediums 830 (for example, one or more mass storage devices) storing a storage application 842 or data 844. Herein, the memory 832 and the storage medium 830 may be capable of temporary storage or persistent storage. The program stored in the storage medium 830 may include one or more modules (not shown in the figure), and each module may include a series of instruction operations for the background server 800. In this embodiment, the central processing unit 822 may be configured to communicate with the storage medium 830 and execute a series of instruction operations in the storage medium 830 on the background server 800.

The background server 800 may also include one or more power supplies 829, one or more wired or wireless network interfaces 850, one or more input-output interfaces 858, one or more keyboards 856, and/or, one or more operating systems 841, such as Windows Server, Mac OS X, Unix, Linux, FreeBSD, etc.

The background server 800 may include a memory, and one or more programs stored in the memory and configured to be executed by one or more processors, and the one or more programs may include instructions for transcoding the video.

Those skilled in the art may understand that all or some steps of the embodiments described above may be completed by hardware or by a program instructing related hardware, and the program may be stored in a computer readable storage medium. The storage medium described above may be a read-only memory, a magnetic disk, an optical disk or the like.

The above are only part of the embodiments of the present disclosure, which are not intended to limit the present disclosure. Any modification, equivalent replacement, improvement, or the like made within the spirit and principle of the present disclosure shall be included in the protection scope of the present disclosure.

What is claimed is:

1. A method for transcoding a video, comprising:
acquiring a target frame image of a video to be transcoded, and generating a global feature map of the target frame image based on a feature extraction module of a semantic segmentation model;
performing feature segmentation on the global feature map based on a feature segmentation module of the semantic segmentation model, and determining a multi-level region of interest (ROI) of the target frame image; and
using different transcoding rates to transcode the multi-level ROI and other regions of the target frame image respectively;
wherein determining the multi-level ROI of the target frame image comprises:
determining multiple components of at least one target object in the target frame image; and
determining the multi-level ROI of the target frame image based on a preset transcoding priority corresponding to each of the multiple components.

2. The method according to claim 1, further comprising:
training the semantic segmentation model periodically based on image materials in a preset training material set, wherein the image materials are marked with contour lines of various components of different objects.

3. The method according to claim 1, wherein before generating the global feature map of the target frame image based on the feature extraction module of the semantic segmentation model, the method further comprises:

detecting a target video type to which the video to be transcoded belongs, and calling a target semantic segmentation model corresponding to the target video type of the video to be transcoded; wherein dedicated semantic segmentation models are trained for frame images in videos of different video types, and one semantic segmentation model is dedicated to performing the semantic segmentation on frame images in videos of one video type; or     detecting a target image type to which the target frame image belongs, and calling a target semantic segmentation model corresponding to the target image type of the target frame image; wherein dedicated semantic segmentation models are trained for frame images of different image types, and one semantic segmentation model is dedicated to performing the semantic segmentation on frame images of one image type; or     detecting a target video type to which the video to be transcoded belongs and a target image type to which the target frame image belongs, and calling a target semantic segmentation model corresponding to the target video type and the target image type; wherein, dedicated semantic segmentation models are trained for frame images of different image types in videos of different video types, and one semantic segmentation model is dedicated to performing the semantic segmentation on frame images of one image type in the video of one video type.

4. The method according to claim 1, wherein the higher the transcoding priority corresponding to a ROI, the higher the transcoding rate of the ROI; and the other regions are transcoded with a lowest transcoding rate.

5. The method according to claim 4, wherein using the different transcoding rates to transcode the multi-level ROI and other regions of the target frame image respectively comprises:

selecting a target-level transcoding rate sequentially in a descending order of the transcoding rate; and     selecting, in a descending order of the transcoding priority, a transcoding region corresponding to the target-level transcoding rate from unselected ROIs according to a transcoding area corresponding to the target-level transcoding rate.

6. The method according to claim 5, further comprising:

adjusting the transcoding area corresponding to the transcoding rate of each level periodically according to current device performance load and line bandwidth load, and attribute information of the video to be transcoded.

7. The method according to claim 1, wherein after determining multiple components of the at least one target object in the target frame image, the method further comprises:

adjusting the transcoding priority corresponding to the components of each target object according to a video type of the video to be transcoded and an object type of each target object.

8. The method according to claim 1, wherein using the different transcoding rates to transcode the multi-level ROI and other regions of the target frame image respectively comprises:

receiving information of feature clarity or fuzz of the video to be transcoded, and determining a target feature region in the target frame image according to the information of feature clarity or fuzz; and     using the different transcoding rates to transcode the multi-level ROI, the target feature region and other regions of the target frame image respectively.

9. The method according to claim 1, wherein the semantic segmentation model uses a TensorRT engine to implement accelerated operations.

10. A background server, comprising a processor and a memory, wherein the memory stores at least one instruction, at least one program, a code set or an instruction set which, when loaded and executed by the processor, causes the processor to perform a method for transcoding a video; wherein the method comprises:

acquiring a target frame image of a video to be transcoded, and generating a global feature map of the target frame image based on a feature extraction module of a semantic segmentation model;

performing feature segmentation on the global feature map based on a feature segmentation module of the semantic segmentation model, and determining a multi-level region of interest (ROI) of the target frame image; and     using different transcoding rates to transcode the multi-level ROI and other regions of the target frame image respectively;

wherein determining the multi-level ROI of the target frame image comprises:

determining multiple components of at least one target object in the target frame image; and         determining the multi-level ROI of the target frame image based on a preset transcoding priority corresponding to each of the multiple components.

11. The background server according to claim 10, wherein the method further comprises:

training the semantic segmentation model periodically based on image materials in a preset training material set, wherein the image materials are marked with contour lines of various components of different objects.

12. The background server according to claim 10, wherein before generating the global feature map of the target frame image based on the feature extraction module of the semantic segmentation model, the method further comprises:

detecting a target video type to which the video to be transcoded belongs, and calling a target semantic segmentation model corresponding to the target video type of the video to be transcoded; wherein dedicated semantic segmentation models are trained for frame images in videos of different video types, and one semantic segmentation model is dedicated to performing the semantic segmentation on frame images in videos of one video type; or     detecting a target image type to which the target frame image belongs, and calling a target semantic segmentation model corresponding to the target image type of the target frame image; wherein dedicated semantic segmentation models are trained for frame images of different image types, and one semantic segmentation model is dedicated to performing the semantic segmentation on frame images of one image type; or     detecting a target video type to which the video to be transcoded belongs and a target image type to which the target frame image belongs, and calling a target semantic segmentation model corresponding to the target video type and the target image type; wherein, dedicated semantic segmentation models are trained for frame images of different image types in videos of different video types, and one semantic segmentation model is dedicated to performing the semantic segmentation on frame images of one image type in the video of one video type.

13. The background server according to claim 10, wherein the higher the transcoding priority corresponding to a ROI, the higher the transcoding rate of the ROI; and the other regions are transcoded with a lowest transcoding rate.

14. The background server according to claim 13, wherein using the different transcoding rates to transcode the multi-level ROI and other regions of the target frame image respectively comprises:

selecting a target-level transcoding rate sequentially in a descending order of the transcoding rate; and selecting, in a descending order of the transcoding priority, a transcoding region corresponding to the target-level transcoding rate from unselected ROIs according to a transcoding area corresponding to the target-level transcoding rate.

15. The background server according to claim 14, wherein the method further comprises:

adjusting the transcoding area corresponding to each level of the transcoding rate periodically according to current device performance load and line bandwidth load, and attribute information of the video to be transcoded.

16. The background server according to claim 10, wherein after determining multiple components of the at least one target object in the target frame image, the method further comprises:

adjusting the transcoding priority corresponding to the components of each target object according to a video type of the video to be transcoded and an object type of each target object.

17. The background server according to claim 10, wherein using the different transcoding rates to transcode the multi-level ROI and other regions of the target frame image respectively comprises:

receiving information of feature clarity or fuzz of the video to be transcoded, and determining a target feature region in the target frame image according to the information of feature clarity or fuzz; and using the different transcoding rates to transcode the multi-level ROI, the target feature region and other regions of the target frame image respectively.

18. A computer readable storage medium storing at least one instruction, at least one program, a code set or an instruction set which, when loaded and executed by a processor, causes the processor to perform a method for transcoding a video; wherein the method comprises:

acquiring a target frame image of a video to be transcoded, and generating a global feature map of the target frame image based on a feature extraction module of a semantic segmentation model;

performing feature segmentation on the global feature map based on a feature segmentation module of the semantic segmentation model, and determining a multi-level region of interest (ROI) of the target frame image; and using different transcoding rates to transcode the multi-level ROI and other regions of the target frame image respectively;

wherein determining the multi-level ROI of the target frame image comprises:

determining multiple components of at least one target object in the target frame image; and determining the multi-level ROI of the target frame image based on a preset transcoding priority corresponding to each of the multiple components.

* * * * *